(12) United States Patent
Recher et al.

(10) Patent No.: US 12,076,920 B2
(45) Date of Patent: Sep. 3, 2024

(54) 3D PRINTER FOR ADDITIVE MANUFACTURING OF A MULTILAYER COMPONENT, PRINTING METHOD AND COMPONENT

(71) Applicant: TDK Electronics AG, Munich (DE)

(72) Inventors: Christoph Recher, Frauental (AT); Thomas Lenzen, Graz (AT)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 17/763,556

(22) PCT Filed: Jan. 21, 2021

(86) PCT No.: PCT/EP2021/051346
§ 371 (c)(1),
(2) Date: Mar. 24, 2022

(87) PCT Pub. No.: WO2021/151778
PCT Pub. Date: Aug. 5, 2021

(65) Prior Publication Data
US 2022/0339861 A1    Oct. 27, 2022

(30) Foreign Application Priority Data

Jan. 29, 2020   (AT) ............................ GM50015/2020

(51) Int. Cl.
| | |
|---|---|
| *B29C 64/165* | (2017.01) |
| *B29C 64/205* | (2017.01) |
| *B29C 64/232* | (2017.01) |
| *B29C 64/236* | (2017.01) |
| *B29C 64/245* | (2017.01) |
| *B29C 64/255* | (2017.01) |

(Continued)

(52) U.S. Cl.
CPC .......... *B29C 64/165* (2017.08); *B29C 64/205* (2017.08); *B29C 64/232* (2017.08);
(Continued)

(58) Field of Classification Search
CPC .................................................. B29C 64/357
See application file for complete search history.

(56) References Cited

U.S. PATENT DOCUMENTS

| | | | |
|---|---|---|---|
| 2,720,479 A | * | 10/1955 | Crawford .................. C08J 5/125 |
| | | | 525/356 |
| 11,254,052 B2 | | 2/2022 | Barnhart et al. |

(Continued)

FOREIGN PATENT DOCUMENTS

| | | |
|---|---|---|
| CN | 105383059 A | 3/2016 |
| CN | 110039049 A | 7/2019 |

(Continued)

*Primary Examiner* — Timothy Kennedy
(74) *Attorney, Agent, or Firm* — Slater Matsil, LLP

(57) ABSTRACT

In an embodiment a 3D printer for additive manufacturing of a multilayer component includes a work surface, at least two movable dispensers configured to coat the work surface with one of at least two different raw materials in each case, wherein at least a part of the respective raw material is addable to the component as a layer in a manufacturing step, and at least two movable recovering devices configured to selectively recover the respective raw material which is not consumed when a layer is added to the component and return the recovered raw material to a respective associated dispenser.

13 Claims, 4 Drawing Sheets

(51) Int. Cl.
   *B29C 64/264* (2017.01)
   *B29C 64/336* (2017.01)
   *B29C 64/35* (2017.01)
   *B29C 64/357* (2017.01)
   *B33Y 10/00* (2015.01)
   *B33Y 30/00* (2015.01)
   *B33Y 40/00* (2020.01)
   *B33Y 80/00* (2015.01)

(52) U.S. Cl.
   CPC .......... *B29C 64/236* (2017.08); *B29C 64/245* (2017.08); *B29C 64/255* (2017.08); *B29C 64/264* (2017.08); *B29C 64/336* (2017.08); *B29C 64/35* (2017.08); *B29C 64/357* (2017.08); *B33Y 10/00* (2014.12); *B33Y 30/00* (2014.12); *B33Y 40/00* (2014.12); *B33Y 80/00* (2014.12)

(56) References Cited

U.S. PATENT DOCUMENTS

| | | |
|---|---|---|
| 11,458,672 B2 | 10/2022 | John et al. |
| 2002/0090410 A1* | 7/2002 | Tochimoto ............ B29C 64/357 425/215 |
| 2013/0052291 A1* | 2/2013 | Morikawa .............. B33Y 40/20 425/135 |
| 2015/0336330 A1 | 11/2015 | Herzog |
| 2017/0182708 A1 | 6/2017 | Lin et al. |
| 2018/0043619 A1 | 2/2018 | Kim et al. |
| 2018/0264731 A1* | 9/2018 | Kritchman ............ B29C 64/357 |
| 2018/0272608 A1* | 9/2018 | Yun ....................... B29C 64/245 |
| 2018/0333913 A1 | 11/2018 | Lin et al. |
| 2019/0126536 A1 | 5/2019 | Thompson |
| 2020/0254691 A1* | 8/2020 | Mamrak ............... B29C 64/153 |

FOREIGN PATENT DOCUMENTS

| | | |
|---|---|---|
| CN | 110667110 A | 1/2020 |
| DE | 102011088158 A1 | 6/2013 |
| DE | 102013000511 A1 | 7/2014 |
| EP | 2156942 A1 | 2/2010 |
| EP | 3053730 A1 | 8/2016 |
| EP | 3127636 A1 | 2/2017 |
| JP | 2020066236 A1 | 4/2020 |
| WO | 2015107066 A1 | 7/2015 |
| WO | 2017009368 A1 | 1/2017 |
| WO | 2017014729 A1 | 1/2017 |
| WO | 2019089496 A1 | 5/2019 |

\* cited by examiner

3D PRINTER FOR ADDITIVE MANUFACTURING OF A MULTILAYER COMPONENT, PRINTING METHOD AND COMPONENT

This patent application is a national phase filing under section 371 of PCT/EP2021/051346, filed Jan. 21, 2021, which claims the priority of Australian patent application GM50015/2020, filed Jan. 29, 2020, each of which is incorporated herein by reference in its entirety.

TECHNICAL FIELD

The invention relates to a 3D printer for additive manufacturing of a multilayer component, a method for additive manufacturing of a three-dimensional multilayer component, and a 3D-printed multilayer component.

BACKGROUND

By photopolymerization in a bath (cf. DIN EN ISO 17296), multilayer components can be structured and built up layer by layer. Corresponding printing apparatuses are characterized by the fact that a raw material is fed into a bath or applied to another work surface and then structured and cured in contact with a multilayer component. In some processes, only one layer of a raw material at a time is applied to a work surface and then patterned and cured in contact with the component. A multilayer component is formed by repeating the steps with, if necessary, a different structure of the layer transferred to the component.

Common methods for structuring and curing the raw material are stereolithography (SLA) or digital light processing (DLP). In these processes, the raw material is irradiated by usually programmable digital radiation sources. SLA processes usually use swivelling lasers for this purpose, while DLP processes use projectors, for example. The irradiation follows a predetermined pattern. The raw material, which in this case is photosensitive, then cures by photopolymerization of a binder it contains.

International patent application WO 2015/107066 A1 discloses a DLP 3D printer in which the raw material is applied to and transported from a conveyor belt to the work surface. Since usually only a part of the available raw material is consumed for structuring the new layer, more raw material has to be used than is necessary for manufacturing the component. The excess raw material used makes the printing process inefficient and expensive.

In international patent application WO 2017/009368 A1, another 3D printer with a conveyor belt is disclosed. Here, the raw material left over in the printing process is collected by a recovering device and can then be used again in the manufacturing process. To print with a second raw material, the entire printer comprising the recovering device must be cleaned to remove residues of the first raw material. Thus, printing a component comprising multiple layers of different materials is not possible in a single printing operation.

US application US 2017/0182708 A1 discloses a 3D printer with a laterally moving work surface. With the help of several raw material dispensers, different raw materials can be applied here. The work surface and the component must be cleaned before each material change. Recovery of excess raw material is not provided for in the disclosed device.

A large number of components contain multiple layers comprising different materials. This is usually only possible in 3D printing with complex manufacturing processes in which the individual components are printed separately, for example, and then added together. Although the state of the art includes initial approaches for printing multilayer components comprising different materials, these are inefficient and expensive due to the excess raw material to be used and the equipment required.

SUMMARY OF THE INVENTION

Embodiments provide a 3D printer and a printing method that can be used to manufacture a multilayer component comprising different materials in an efficient, resource-saving and cost-effective manner.

Embodiments provide a 3D printer for additive manufacturing of a multilayer component.

The 3D printer comprises a work surface on which the printing process takes place. Further, the printer comprises at least two movable dispensers configured to coat the work surface with one of at least two different raw materials, respectively. In one embodiment, the work surface may be unmovable.

The dispensers may comprise various technical embodiments. For example, the dispensers may be die coaters, syringe pumps, peristaltic pumps, ink jet heads, roller transfer apparatus, or transfer film.

At least part of a layer of the respective raw material applied to the work surface by the dispenser is added to the component as a layer during the printing process. The manufacturing process here is an additive photopolymerization process. The first layer of the component can be added directly to a building plate provided for this purpose. The subsequent layers are added to the last printed layer of the component. The printed component then grows layer by layer on the building plate.

In addition, the 3D printer includes at least two movable recovering devices for selectively recovering the respective raw material that is not consumed when a layer is attached to the component and returning the recovered raw material to the respective associated dispenser.

Further, the recovering devices can have different technical designs. Possible embodiments are suction nozzles, wipers, blades or rollers.

Each individual raw material is thus assigned, on the one hand, a dispenser which applies only this one raw material and, on the other hand, a recovering device which recovers only this one raw material and returns it to the associated dispenser.

This ensures that the various raw materials do not mix with each other either during the manufacturing process or during recovery. The excess raw material can therefore be recovered in consistent quality and reused in the manufacturing process. In this way, a printer can print a component with several layers of different materials in a single printing process in an efficient and resource-saving manner.

Due to the mobility of the dispensers, the return of the raw material to the respective dispenser can be done in two ways. On the one hand, the recovering device can be firmly connected to the movable dispenser by a hose. On the other hand, the raw material can be transported back from the recovering device to a supplying device, from which the dispenser can be filled before starting a new printing step. In this case, the recovering device and the dispenser are not fixed to each other.

The movable dispenser makes it possible to decouple the place of material supply from the place of manufacturing. The movable recovering device makes it possible to decouple the place of manufacturing from the place of material recovery. Thus, a flexible setup of the printer is possible.

The 3D printer may further comprise a window in the work surface that is permeable to radiation. In this case, the printer further comprises a radiation source positioned below the window so that it can irradiate and thus cure the raw material through the window. The radiation permeability of the work surface enables the raw material to be cured by exposure. The radiation source is, for example, a laser (SLA process) or a projector (DLP process). Radiation is defined here and below as visible light, light in the infrared (IR) and ultraviolet (UV) range, X-rays and all other forms of electromagnetic radiation.

Further, the 3D printer may include a building plate, on the underside of which the component is fabricated and adhered, positioned above and parallel to the work surface. The building plate may be raised and lowered normal to the work surface. For this purpose, the 3D printer includes a positioning system that can raise and lower the building plate. The positioning system thus determines the distance between the previously printed layer of the building plate and the work surface. The first layer is printed directly onto the building plate. The set distance then determines the thickness of the layer to be attached to the component.

Several components can also adhere to the building plate, to which new layers are added in parallel. In this design, all components are located above the work surface and within the area of the radiation permeable window.

The raw materials used during the printing process include pastes, which can contain either a ceramic or a metallic or an organic powder and a photopolymerizable, i.e. polymerizing under radiation, organic binder. Such a raw material can be structured and cured by irradiation with light. UV light, for example, stimulates a UV-sensitive organic binder to polymerize, forming cured structures in the raw material.

Printing can be followed by a debinding process and a sintering process. These processes are carried out to remove the organic binder, leaving structured layers comprising only ceramic or metallic material. In the case of polymer layers, these steps can be omitted. Thus, a desired multilayer structure comprising ceramic, metallic and polymer layers can be set and obtained in the component.

In one embodiment, the dispenser and the recovering device are designed as a single element. That is, the same element is used for coating the work surface with a new raw material and for removing remaining uncured raw material from the work surface. This component includes, for example, a container for storing the raw material, a coating device for coating the work surface, and a recovering device that recovers the raw material from the work surface and conveys it to the container.

The coating device can be designed, for example, as a die coater, a syringe pump, a peristaltic pump, or an inkjet head. The recovering device can be designed, for example, as a suction nozzle or blade.

The element can, for example, be an element that can be moved laterally over the work surface. The application of the raw material to the work surface and the recovery can be carried out by this element simultaneously or in separate steps, so that the element either only applies or only recovers the respective raw material in one step.

Combining the dispenser and recovering device into one element reduces the amount of equipment required to construct the 3D printer. Furthermore, it allows the supply and recovery of the raw material to be performed in one process step, making the printing process more efficient.

In a further embodiment, at least two dispensers are implemented in one element. The element can thus apply two different raw materials to the work surface. In one step, however, only one raw material is applied at a time. The building element is adapted to move laterally across the fixed work surface. The element may further comprise a container for storing the raw material.

The coating device can, for example, be designed as mentioned above. Implementing two dispensers in one element reduces the number of required elements and thus simplifies the apparatus design of the 3D printer.

In general, the dispensers may always include a container for storing the raw material and a coating device for coating the work surface with raw material. The container for storing the raw material may be refilled with unused raw material by the recovering device. For this purpose, the recovering device may comprise a recirculation device, such as a hose, by which the raw material in the dispenser is recirculated. The transport may be conveyed by a pump or similar conveying unit. If the dispenser and recovering device are combined in one element, the return device is unnecessary. In addition, the container can also be filled with newly added raw material.

In one embodiment, the container of the dispenser includes a mixing device with which the returned raw material and possibly added new raw material are mixed to ensure a homogeneous composition of individual printed layers.

In a further embodiment, at least two recovering devices may be implemented in one element. Possible embodiments of the recovering device are mentioned above. The element may further comprise a container for storing the respective raw materials. The embodiment of two recovering devices in one element reduces the apparative effort for the construction of the 3D printer.

In one embodiment, an element may include two dispensers and two recovering devices. Combining these elements simplifies the design of the printer and enables recovery and application of even different raw materials in one process step, which can significantly simplify the printing process. In one step, however, only one raw material is applied and one raw material is recovered at a time. For this purpose, the element can further comprise two containers for storing the two different raw materials.

The element may move laterally over the entire area of the work surface of width B and length L used for the printing operation. Here, for example, a first unit of the element can serve for the application and recovery of a first raw material and a second unit of the same element can serve for the application and recovery of a second raw material. Once the first raw material has been applied to the work surface and a printing operation has been performed on that raw material, the element is moved, first unit first, across the work surface to recover the first raw material. This can be done, for example, by suctioning the first raw material. The raw material is stored in a first container in the build element. The second unit of the element, which is moved over the work surface in the same step, applies a second raw material to the work surface, which is stored in a second container in the element.

The number of elements, dispensers, and recovering devices of the 3D printer is not limited. Instead of two, the 3D printer may include three, four, or more dispensers and recovering devices, each associated with its own raw material. A single device may include all or more of these dispensers and/or recovering devices. Alternatively, the individual dispensers and/or recovering devices may be implemented in a plurality of individual elements. However, a higher number of elements also increases the apparatus effort required to construct the 3D printer.

In another embodiment, the 3D printer comprises at least two troughs located at different edges of the work surface, wherein the movable recovering devices can push the unused raw material into the respective associated trough. Each raw material is associated with its own trough in this embodiment.

The recovering devices are designed, for example, as wipers or blades that push the unused raw material from the work surface into the associated trough by moving it laterally across the work surface. The trough is connected to a return device that returns the raw material from the trough to an associated dispenser. Several different troughs for different raw materials may be located on different sides of the work surface.

In a preferred embodiment, the recovering devices move across the work surface in such a way that when they move completely across the work surface, they can push the raw materials left behind completely into the respective associated trough.

In one embodiment, the 3D printer includes a cleaning device for cleaning raw material from the component. The cleaning device may include a drive system for moving the cleaning device laterally along the surface of the component.

The cleaning device can be, for example, a suction nozzle, a blade or a roller. The cleaning device is preferably arranged so that it is positioned laterally next to the component in the passive state and can move laterally over the surface of the component in the active state.

A separate cleaning device may be provided for each raw material, so that the printer comprises at least two such cleaning devices.

Each cleaning device comprises a return device, wherein each return device comprises a conveying device which returns the recovered raw material to the respective associated dispenser. For example, the conveying device is a pump and the return device is a hose. The separate return devices ensure that the raw material is not mixed and can thus be reused.

In one embodiment, the return device may be identical to the cleaning device. For example, a roller may be used that has an adherent surface and removes any remaining raw material by moving over the component surface thereon. The roller can then be moved by a positioning system to the dispenser, where the raw material is removed from the roller and filled into the dispenser. Such a device is called a roller transfer apparatus.

Alternatively, the cleaning device may comprise a transfer film with an adhesive surface. If the cleaning device is a suction nozzle, the return device can be designed as a hose, which contains, for example, a pump or a blower as a conveying device. If the cleaning device is designed as a blade that scrapes over the surface of the component, the return device can be a trough located under the component that can be moved to the dispenser by a positioning system.

Embodiments further provide a method for additive manufacturing of a three-dimensional, multilayer component and recovering unused raw material, comprising the following steps:

Applying a layer of a raw material to a work surface by coating with a dispenser moving laterally across the work surface, wherein the layer thickness of raw material corresponds at least to the desired layer thickness of a layer to be added to the component.

Usually, an excess of raw material is required to produce an intact layer with the desired dimensions.

Bringing the layer of raw material into contact with a surface of the component to be coated on the work surface and structurally curing a portion of the raw material to form a new structured layer of the component.

The first layer of the component is manufactured in contact with the surface of a designated building plate.

Lifting the component comprising the new layer from the work surface.

Lifting separates the component with the applied cured layer from the uncured raw material. It is possible that some of the excess raw material remains attached to the component.

Removing the remaining raw material from the work surface using a recovering device moving laterally across the work surface and returning the raw material to a dispenser.

The recovering device may be, for example, a suction nozzle, a blade, or a roller, and may further comprise a device for returning a raw material to the dispenser. In the case of the suction nozzle, a container for storing the raw material is usually present in the same element as the recovering device. From this, for example, a hose leads either directly to the associated dispenser or to a further container from which the first dispenser can be filled. The dispenser and the recovering device can also be designed as described above in one and the same element.

In the case of a blade or wiper, the raw material is usually pushed to a trough attached to the side of the work surface, to which, for example, a hose is attached to return the raw material. In the case of a roller, the recovering device may be designed as a transfer roller machine. The transfer roller picks up raw material via its adherent surface, can then be moved to the dispenser, and there releases the raw material back to the corresponding dispenser.

repeating the aforesaid process steps with the same or a second raw material and, in the latter case, a second dispenser, a second recovering device being provided so that the first and second raw materials can each be selectively recycled to the respective dispenser.

In a further embodiment of the process, the aforementioned process steps are repeated with a third or further raw material and a third or further dispenser as well as third or further recovering devices. The third raw material is selectively recycled into the respective dispenser. The further raw materials are also each selectively recycled into the respective further dispensers. No mixing of the raw materials takes place, so that they can be used again in the printing process.

The work surface itself can remain motionless. Then, in the process described, when the raw material is applied and when the raw material is recovered, the respective dispensers and/or recovering devices are each moved laterally across the work surface. This lateral movement allows the dispensers and recovering devices to reach the entire area of the work surface used for the printing process.

In one embodiment of the process, the work surface has a window that is permeable to radiation. In its dimension, the window has at least the dimensions of the layer to be added. A building plate with the component is positioned over the window. The building plate is lowered normal to the window until the distance between the surface of the component and the top of the work surface corresponds to the desired layer thickness of the new structured layer to be added to the component. When printing the first layer of the component, the building plate is lowered so that the distance between the surface of the building plate and the work surface corresponds to a desired thickness of the first layer.

In this process, the raw material is structured and cured by irradiating the multilayer component through the window to form a new layer. For this purpose, the raw material comprises a binder which has photosensitive properties. The irradiation causes polymerization of the binder.

In the process, the building plate with the component and the new layer adhering to it is also lifted off the work surface. For this purpose, at least in one embodiment, the adhesion between the component and the building plate is greater than the adhesion between the component and the work surface. This greater adhesion of the component to the building plate is ensured by selecting the material of the building plate and by a high surface roughness of the building plate compared to the work surface. High roughness facilitates adhesion of the component to the building plate. When selecting the building plate material, it may be advantageous to select a material with similar properties to the material of the component or a roughened metal plate.

In one method, the following subsequent steps are performed:

Providing a cleaning device for cleaning raw material from the component.

The cleaning device is preferably positioned laterally next to the component.

Removal of the excess raw material from the surface of the component by lateral movement of the cleaning device along the surface of the component.

The cleaning device can be, for example, a suction nozzle, a blade or a roller.

Return of the raw material to the dispenser corresponding to the raw material by an associated return device.

In the case of the suction nozzle, the return device can be, for example, a hose system or a pipe system. In the case of the roller, it can be a transfer roller machine. Each raw material is assigned a corresponding cleaning device with a corresponding return device so that the raw materials are not mixed.

Embodiments further provide a component comprising a plurality of layers that
  are delimited from each other along a flat surface,
  include different materials, and
  are directly chemically bonded to each other.

Embodiments further provide a component having the aforementioned properties, the layers of which each have a thickness of 300 µm or less. Preferably, a component has layers with thicknesses between 5 µm and 200 µm.

The layers can be arranged both laterally and vertically next to each other. The delimiting surfaces between different layers may be parallel to the outer surfaces of the component. The materials of the component may include different metals and ceramics, or either of them. No additional bonding means, such as adhesives, are provided between the individual ceramic or metal layers. The layer thicknesses can be variably adjusted in the printing process, so that flexible structuring of the component is possible.

In one embodiment, the component has a first structure after printing and comprises a binder. The binder is removed in a sintering step, thereby changing the structure of the component. After sintering, the component is in a desired second structure.

BRIEF DESCRIPTION OF THE DRAWINGS

The invention is explained in more detail below in embodiment examples based on figures. However, the invention is not limited to the forms and examples described or illustrated. The scope of protection is based only on the features disclosed in the claims.

The figures are schematic representations. The figures do not represent true-to-scale illustrations of the 3D printer. Dimensions and proportions may differ from those shown in the figures.

DETAILED DESCRIPTION OF ILLUSTRATIVE EMBODIMENTS

Figure 1:
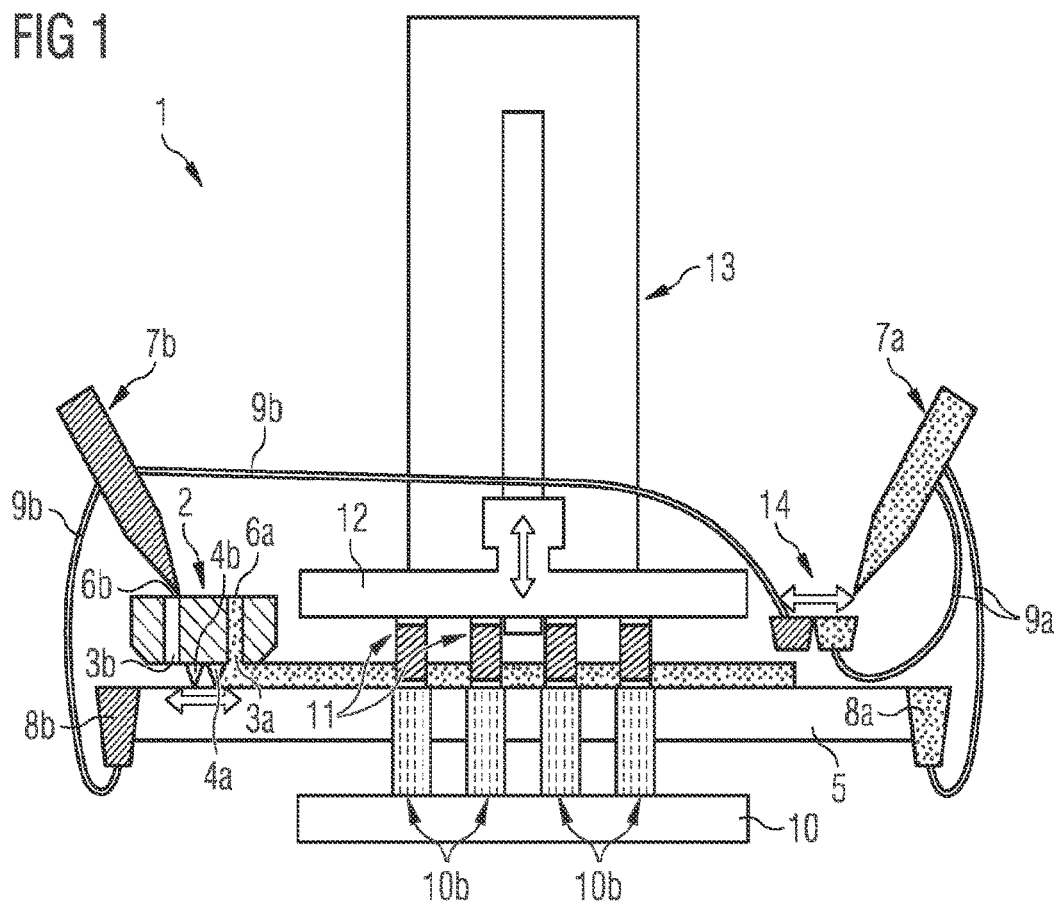
FIG. 1 shows a schematic cross-sectional representation of a first embodiment of the 3D printer with two dispensers and recovering devices in one element.

FIG. 1 shows a first embodiment of the 3D printer 1. The 3D printer 1 is designed to print with two different raw materials. The 3D printer 1 comprises a movable element 2, which comprises two dispensers 3a and 3b and two recovering devices 4a and 4b. The dispensers 3 are configured, for example, as die coaters. The recovering devices 4 are designed, for example, as wipers.

The movable element 2 is movably mounted above a work surface 5. The element 2 is dimensioned, for example, in such a way that its longer extension can cover at least a section of the work surface 5 required for the printing process. This includes all areas of the work surface 5 on which raw material is to be applied during the printing process. By one-dimensional lateral movement in the plane normal to its longer side, the element 2 can thus reach any required section of the work surface 5.

The element 2 is divided into a first unit (on the right in the figure) and a second unit (on the left in the figure). The first unit is used for application and recovery of the first raw material. The second unit is used for application and recovery of the second raw material.

Each unit also includes a container 6 for storing raw material. These containers 6 can be filled by supplying devices 7. A first supplying device 7a for filling a first container 6a is provided at a first side of the work surface 5, and a supplying device 7b for filling a second container 6b is provided at a second side of the work surface 5. The supplying devices 7 can be filled from the outside with newly added raw material. Furthermore, the supplying devices 7 can receive recovered raw material which has not been consumed in the printing process.

To fill the containers 6a or 6b of the element 2, the element 2 is moved to the first or second side of the work surface 5. For example, if the element 2 is at the edge of the first side of the work surface 5, the first container 6a can be filled by the first supplying device 7a. The same applies to the second side.

Two troughs 8 are further provided directly at the edge of the work surface 5 on the first and second sides of the work surface 5. The first recovering device 4a, which is designed as a wiper, wipes the remaining raw material into the first trough 8a when moving over the work surface 5. This trough 8a is connected to the supplying device 7a via a first hose 9a. The hose 9a comprises a pump which also conveys the raw material from the trough 8a to the supplying device 7a. The same applies to the second side.

The work surface 5 further includes a radiation permeable window which occupies most of the surface. Below the window, a projector 10 is arranged to irradiate the raw material between the window and existing components 11, which is to be added as a new layer to the components 11, in a predetermined pattern, thereby structuring and curing it. Exemplary light beams 10b are shown in the figure. The pattern may be defined, for example, in the form of a mask applied to the projector 10. Alternatively, the pattern may be digitally pre-programmed, for example.

The pattern can be designed in such a way that the new layer covers only an area of the underside of the previous component 11 after printing on the component 11. In a later printing process, another layer can thus also be printed laterally next to an existing layer.

Several components 11 are attached to a building plate 12. The number of possible attached components 11 depends on the geometry of the components 11 and the building plate 12. In the present example, four components 11 are attached to the building plate 12. The building plate 12 includes an underside with high surface roughness to which the components 11 adhere well. The building plate 12 is arranged parallel to the work surface 5 above it.

Using a positioning system 13, the building plate 12 with the components 11 can be raised and lowered normal to the work surface 5. For this purpose, the positioning system 13 is positioned centrally above the work surface 5 and vertically to it.

Furthermore, the 3D printer 1 comprises a cleaning device 14 that can be moved along the undersides of the components 11 by a drive system. Said drive system is therefore positioned parallel to the building plate 12 at a sufficiently large distance above the work surface 5 and in front of or behind the positioning system 13. In this case, the cleaning device 14 is designed as a blade which can scrape unused raw material from the components 11.

Figure 2:
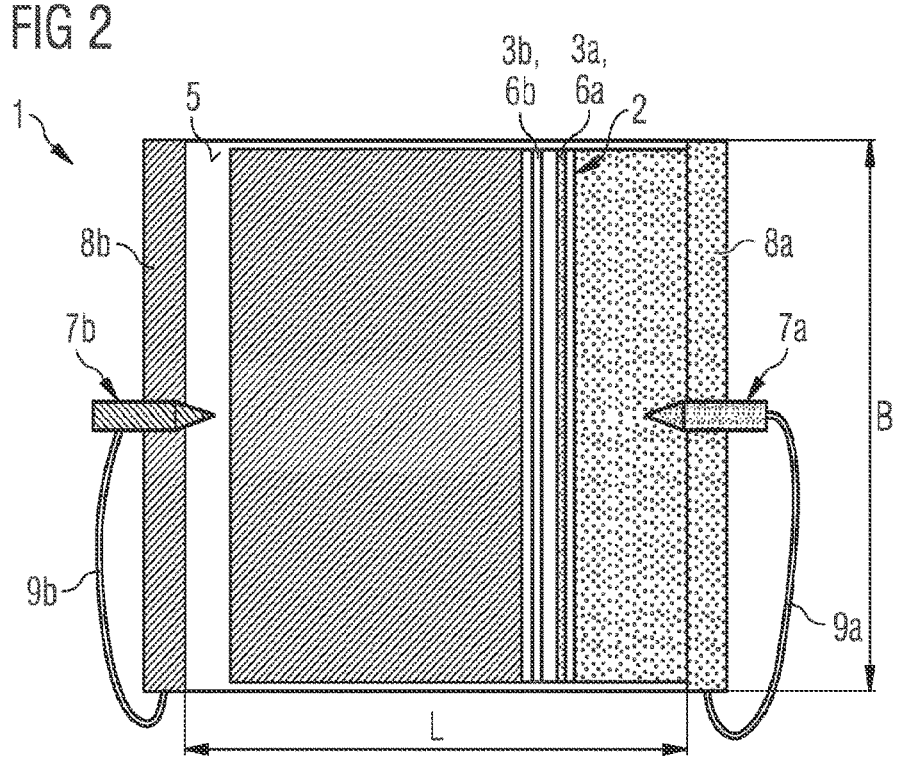
FIG. 2 shows a schematic top view of the first embodiment of the 3D printer.

FIG. 2 shows the first embodiment of the 3D printer 1 in plan view. Between the two troughs 8a and 8b is the work surface 5, which is permeable to radiation. The first trough 8a is connected to the first supplying device 7a by the first tube 9a. The same applies to the second side. Each trough with hose and supplying device is associated with a specific raw material. The raw materials are not mixed during the printing process. Thus, the purity of the raw materials is maintained so that they can be reused in the process.

The movable element 2 extends over a width B of the work surface 5 required for the printing operation, and includes two dispensers 3a and 3b, two recovering devices 4a and 4b, and two containers 6a and 6b for applying, recovering and storing the two raw materials.

The movable element 2 can be moved over a length L of the work surface 5 required for the printing process from the first edge with the first trough 8a to the second edge with the second trough 8b. Thus, both the dispensers 3a and 3b and the recovering devices 4a and 4b can cover the entire length L.

In the example shown in FIG. 2, the first container 6a is filled with new raw material. The element 2 moves from the first to the second side to wipe remaining raw material (shaded area) of the previous printing operation into the second trough 8b and simultaneously apply a second raw material (dotted area) on its right side by the first dispenser 3a.

Other elements of the 3D printer 1 that are present in the sectional view in FIG. 1 but are located above the work surface 5 are not shown again in FIG. 2 for clarity.

In an exemplary method, in a first step A, the first dispenser 3a applies a first raw material as previously described onto the work surface 5. The lateral movement of the dispenser 3a over the work surface 5 allows to completely coat the latter with raw material.

After complete coating by applying the raw material to the work surface, the building plate 12 is lowered by the positioning system 13 (see FIG. 1) in a step B to such an extent that the building plate 12 comes into contact with the raw material applied to the work surface 5 and the distance between the building plate 12 and the work surface 5 corresponds to the desired thickness of the new layer. Excess raw material is displaced here to the edges of the building plate 9 during printing of the first layer.

Then, in step C, the raw material under the building plate 12 is exposed to radiation from a projector 10 according to a desired pattern or structure. The radiation cures the material by photopolymerizing the organic binder and forms a first layer of components 11 that adheres to the building plate 12. The building plate 12 can now be lifted using the positioning system 13, leaving the majority of the remaining uncured raw material on the work surface 5.

Figure 3:
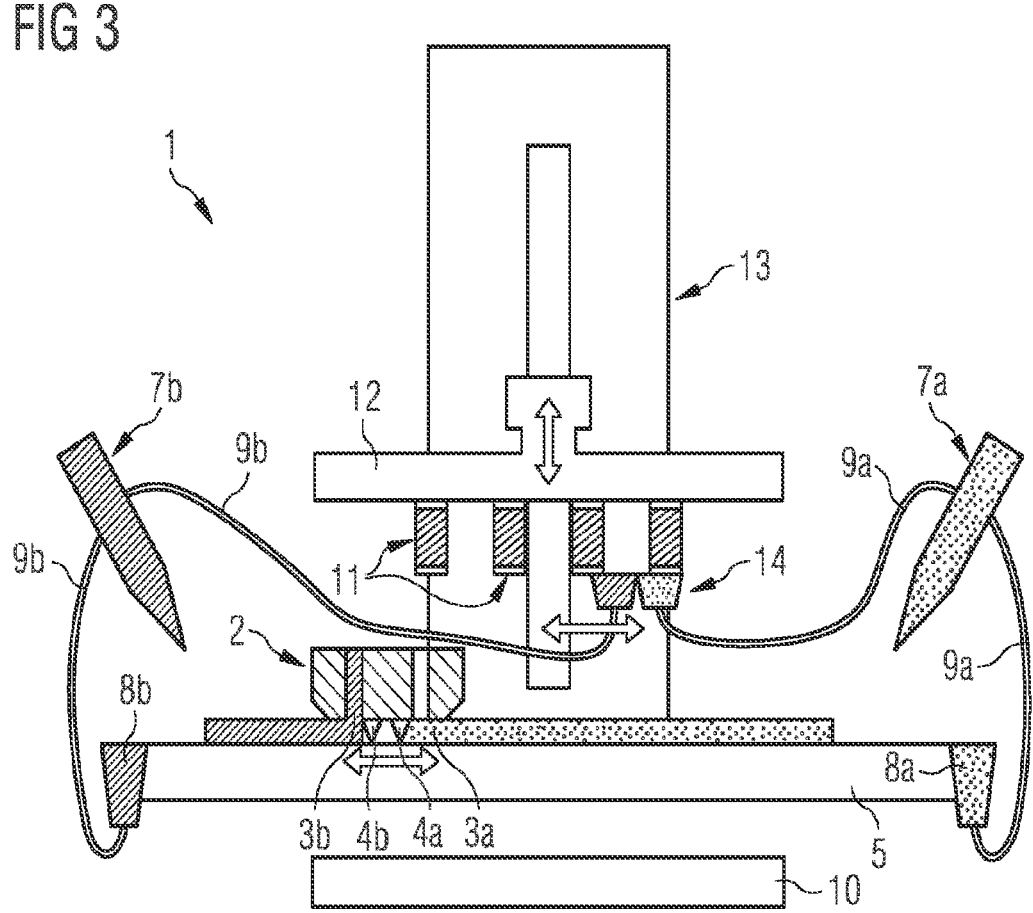
FIG. 3 shows a schematic cross-sectional representation of the first embodiment of the 3D printer in a clean-up step of the printing process.

After lifting the building plate 12 with the components 11 adhering to it, which is shown in FIG. 3., the work surface is completely cleaned of the remaining raw material in step D as previously described by the movable recovering device 4a, which is designed as a wiper in this case. For this purpose, the remaining raw material is pushed, for example, into the trough 8a provided for this purpose. At the same time, new raw material can already be applied from a second dispenser 3b of the same element 2.

In parallel, in step E, the underside of the newly printed layer is cleaned by traversing the surface of the component 11 with the cleaning device 14 (see FIG. 3). The raw material thus recovered is also returned to the associated dispenser 3.

Once the first layer has been printed and cleaned and the first raw material has been completely removed from the work surface 5, a second and then further layers can be applied to the component 11 by repeating the aforementioned process steps with a different cured structure, if necessary.

If a different raw material is provided for the second or a further layer and the individual dispensers 3 are designed in individual, separate elements (cf. second embodiment example), the first dispenser 3a is moved to the edge of the associated side of the work surface 5 so that it does not block the further printing process. Instead, a second or alternatively a third dispenser is inserted from a second or third side of the work surface 5 and the entire process is repeated with a further raw material.

Since then at least one layer of the component 11 already adheres to the building plate 12, in a step F corresponding to step B the component 11 is lowered to such an extent that the distance between the component 11 and the work surface 5 corresponds to the thickness of a desired new layer. Excess raw material is now displaced to the edges of the existing layers of the components 11.

The first raw material is, for example, a ceramic raw material containing an organic binder. The second raw material is, for example, a metallic paste which also contains the organic binder. Further layers may again contain the same or further different raw materials. Each layer can be applied with a different structure or as a different pattern, so that a component with any external geometrical shape and any internal structure can be generated.

Figure 4:
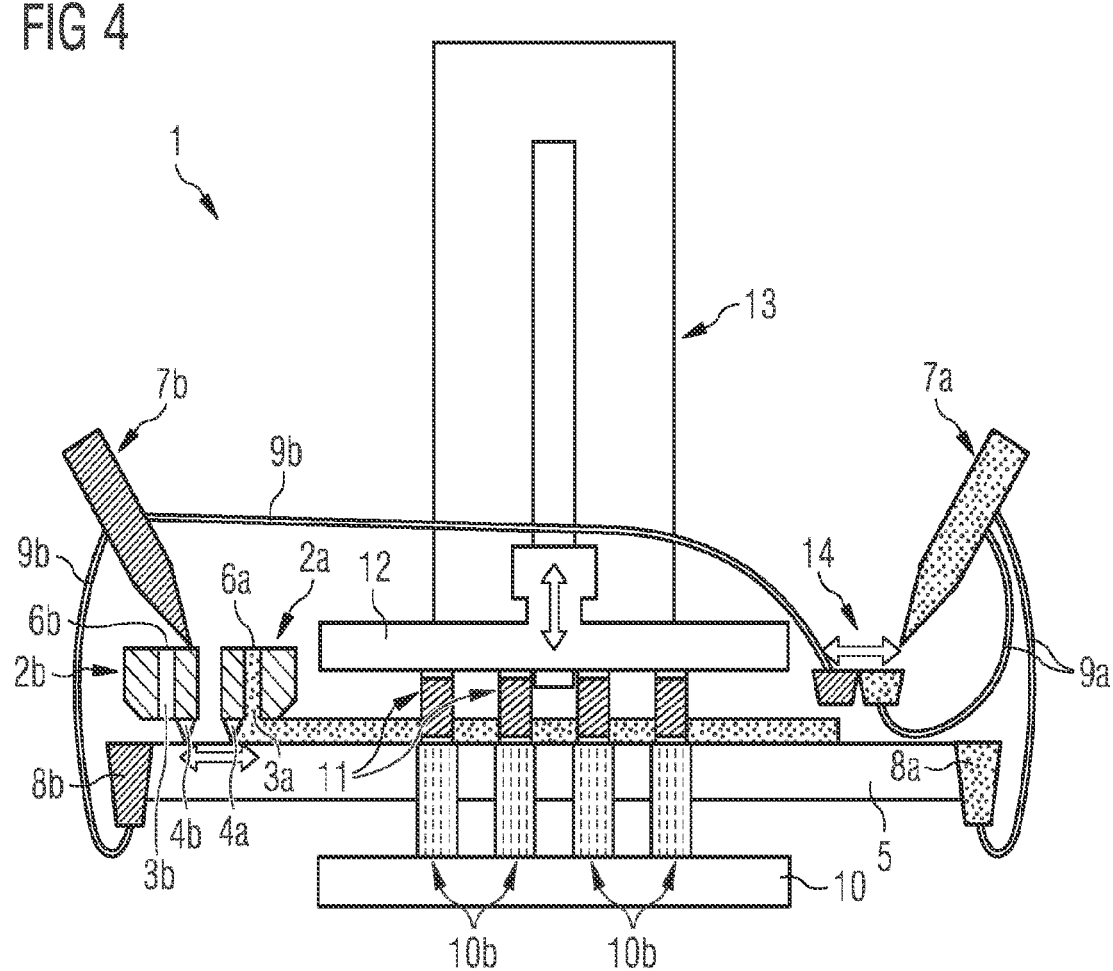
FIG. 4 shows a schematic cross-sectional representation of a second embodiment of the 3D printer with two dispensers and recovering devices in two separate elements.

FIG. 4 shows a second embodiment example of the 3D printer 1. The second embodiment example is essentially similar to the first embodiment example. However, in contrast to the first embodiment example, the 3D printer 1 now comprises two separate and separately movable elements 2a and 2b. Such an embodiment was also mentioned in the previously described method. Each building element 2 comprises a dispenser 3, a recovering device 4 and a container 6, respectively. A building element 2 is assigned to a raw material, respectively. The two elements 2a and 2b can be moved laterally over the work surface 5 separately and independently of each other.

For example, the first raw material (hatched) can first be applied from the dispenser 3b to the work surface 5 by moving the building element 2b over the work surface 5 from the trough 8b to the trough 8a. For this purpose, the container 6b of the building element 2b has previously been filled with corresponding raw material by the supplying device 7b. During this process, the element 2a is located motionless at the edge of the work surface 5 to which the trough 8a is attached, so that it does not obstruct the element 2b.

Once the first raw material has been completely applied, the actual printing process is carried out analogously to steps B, C and E of the first embodiment. The element 2b is located on the side of the trough 8a during the printing process. After printing, the element 2b moves back toward the trough 8b to completely remove the remaining uncured raw material from the work surface 5 by the recovering device 4b.

Then, in a further step, a second raw material (dotted) can be applied to the work surface 5 by the dispenser 3a of the element 2a analogously to the first raw material. For this purpose, the element 2b moves from the trough 8a to the trough 8b. Such independent elements 2 facilitate above all the integration of further elements 2 for printing with three, four or more raw materials.

In the present FIG. 4, the second raw material has already been applied to the entire area of the work surface 5 used for the printing process.

Figure 5:
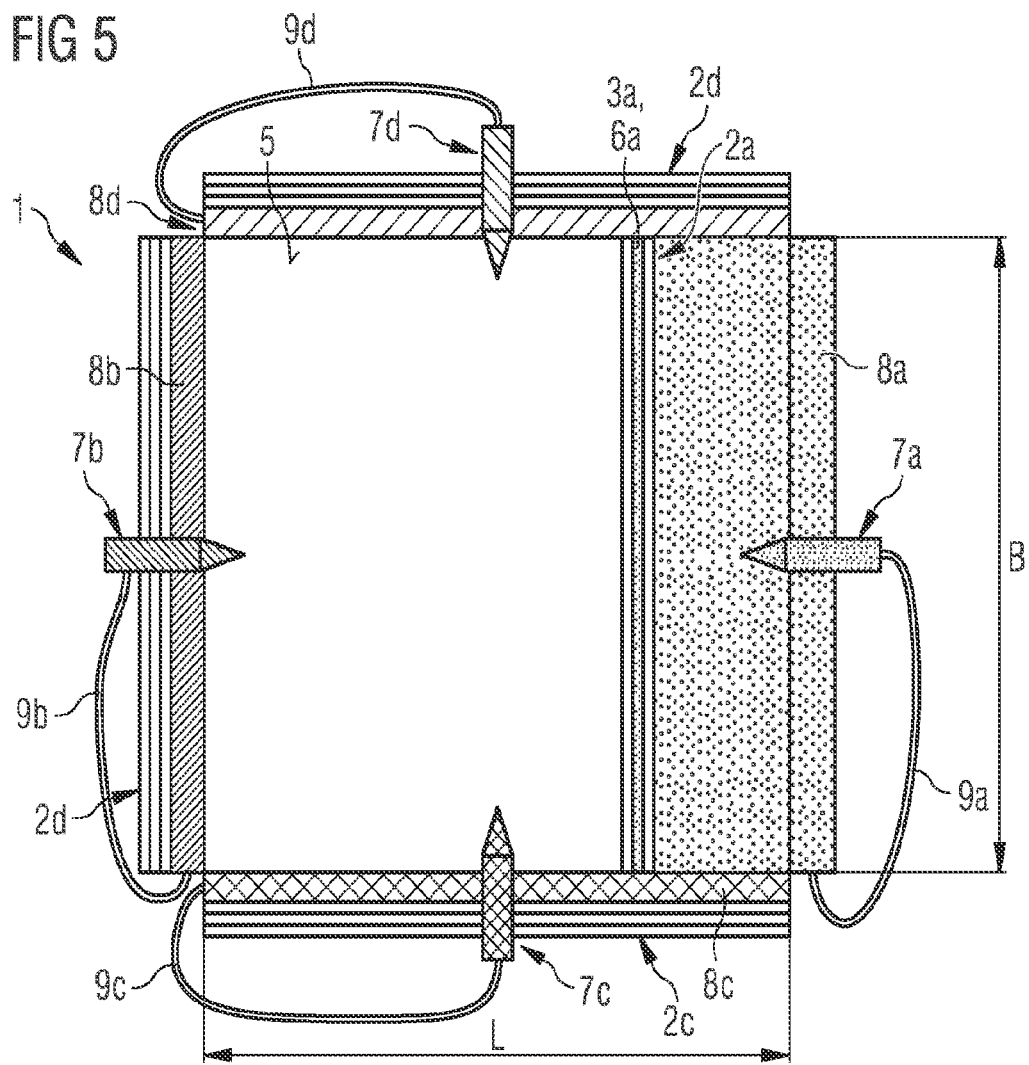
FIG. 5 shows a schematic representation of a third embodiment of the 3D printer with four dispensers and recovering devices each in a top view.

FIG. 5 shows a third embodiment example of the 3D printer 1, which is substantially similar to the previous two embodiment examples. Here, the 3D printer 1 comprises four separate and separately movable elements 2, each comprising dispensers 3, recovering devices 4 and containers 6.

Other elements of the 3D printer 1 located above the work surface 5 are omitted in FIG. 5 for clarity.

The third embodiment of the 3D printer differs from the previous embodiments in the following modifications. In addition to the troughs, hoses, and supplying devices on the first and second sides, troughs 8c, 8d, hoses 9c, 9d, and supplying devices 7c, 7d for two additional raw materials are provided on the other two sides of the work surface 5. The printer can thus print with four different raw materials.

The work surface 5 has a square shape so that the troughs 8a, 8b and elements 2a, 2b are arranged parallel to each other on first and second sides, while the two additional troughs 8c, 8d and elements 2C, 2d are arranged vertically thereto. The two additional troughs and elements are again arranged parallel to each other.

In the present example, the movable elements 2b, c and d are located at the edge of the work surface 5 next to their respective trough 9b, c and d. These elements are not in active use.

On the other hand, the element 2a, which has been filled at the first side by the supplying device 7a, moves over the work surface 5 to coat the work surface 5 with a first raw material (dotted).

Figure 6:
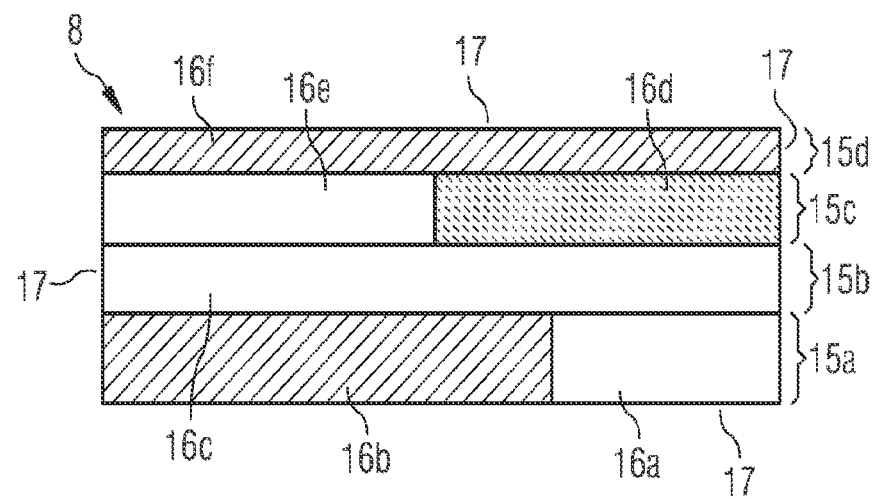
FIG. 6 shows a schematic cross-sectional representation of a printed multilayer component.

FIG. 6 shows schematically an example and of a printed multilayer component 11. Here, the component 11 comprises four vertically stacked planes 15a to 15d, which comprise six layers 16a to 16f. The first and third planes (15a, 15c) from the bottom each comprise two layers (16a, 16b, 16d, 16e). The top layer 16f corresponds to the layer produced first in the printing process. The lowest layers 16a and 16b in the figure were manufactured last in the printing process.

Component 11 comprises layers of three different materials, which are represented by different hatchings. One of the three materials is a metal, the others are two different polymers or ceramics.

The boundary between the layers each extends along a planar interface parallel to the outer sides 17 of the component 11. The individual layers may fully encompass a horizontal plane of the component 11, as in the second and fourth layers (16c, 16f) from below in the present component 11, but the layers may also be laterally adjacent to each other as in the first and third planes (15a, 15c) of the component 11.

The layer thicknesses of the component 11 can vary. The uppermost layer 16f in the component 11 shown is thinner, and the lowermost two layers 16a and 16b are thicker than the other layers of the component 11.

No further intermediate layers or bonding layers, such as adhesive layers, exist between the layers described.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A 3D printer for additive manufacturing of a multilayer component, the 3D printer comprising:
 a work surface;
 at least two movable dispensers configured to coat the work surface with one of at least two different raw materials in each case, wherein at least a part of the respective raw material is addable to the component as a layer in a manufacturing step; and
 at least two movable recovering devices configured to:
  selectively recover the respective raw material which is not consumed when the layer is added to the component; and
  return the recovered raw material to a respective associated dispenser,
 wherein the at least two dispensers and the at least two recovering devices are implemented in one single element of the 3D printer.

2. The 3D printer according to claim 1, further comprising:
 a window in the work surface, the window being permeable to radiation;
 a radiation source arranged under the window, the radiation source configured to irradiate raw material through the window so that the raw material is cured;
 a building plate configured to receive the component at an underside, the building plate being arranged above the work surface and parallel thereto, and configured to be raised and lowered normal to the work surface; and a positioning system configured to:
raise and lower the building plate normal to the work surface; and
determine a distance between the component and the work surface.

3. The 3D printer according to claim 1, wherein each of the raw materials includes a paste comprising either a ceramic, a metallic, or an organic powder and a photopolymerizable organic binder.

4. The 3D printer according to claim 1, wherein the at least two dispensers comprise a container configured to store raw material and a coating device configured to coat the work surface with raw material.

5. The 3D printer according to claim 1, further comprising at least two troughs placed at different edges of the work surface, wherein the movable recovering devices are configured to push unused raw material into an associated trough.

6. The 3D printer according to claim 1, further comprising at least one cleaning device configured to clean at least one of the raw materials from the component.

7. The 3D printer according to claim 6, wherein the cleaning device is movable laterally along a surface of the component by a drive system.

8. The 3D printer according to claim 6, further comprising a return device provided for each of the cleaning devices, wherein each return device comprises a conveying device configured to return the recovered raw material to a respectively associated dispenser.

9. A 3D printer for additive manufacturing of a multilayer component, the 3D printer comprising:
a work surface;
at least two movable dispensers configured to coat the work surface with one of at least two different raw materials in each case, wherein at least a part of the respective raw material is addable to the component as a layer in a manufacturing step; and
at least two movable recovering devices configured to:
selectively recover the respective raw material which is not consumed when the layer is added to the component; and
return the recovered raw material to a respective associated dispenser,
wherein the at least two dispensers and the at least two recovering devices are laterally movable over the work surface.

10. A 3D printer for additive manufacturing of a multilayer component, the 3D printer comprising:
a work surface;
at least two movable dispensers configured to coat the work surface with one of at least two different raw materials in each case, wherein at least a part of the respective raw material is addable to the component as a layer in a manufacturing step;
at least two movable recovering devices configured to:
selectively recover the respective raw material which is not consumed when the layer is added to the component;
return the recovered raw material to a respective associated dispenser;
at least one cleaning device configured to clean at least one of the raw materials from the component; and
a return device provided for each of the cleaning devices, wherein each return device comprises a conveying device configured to return the recovered raw material to a respectively associated dispenser.

11. The 3D printer according to claim 10, wherein the at least two dispensers and the at least two of the recovering device are implemented in one element.

12. The 3D printer according to claim 10, wherein the at least two dispensers are implemented in one element.

13. The 3D printer according to claim 10, wherein the at least two recovering devices are implemented in one element.

* * * * *